United States Patent
Uenoyama et al.

(10) Patent No.: US 9,679,032 B2
(45) Date of Patent: Jun. 13, 2017

(54) DEVICE INFORMATION PROVIDING SYSTEM AND DEVICE INFORMATION PROVIDING METHOD

(71) Applicant: OMRON Corporation, Kyoto-shi, Kyoto (JP)

(72) Inventors: Toru Uenoyama, Nara (JP); Atsushi Hisano, Kyoto (JP)

(73) Assignee: OMRON Corporation, Kyoto (JP)

( * ) Notice: Subject to any disclaimer, the term of this patent is extended or adjusted under 35 U.S.C. 154(b) by 91 days.

(21) Appl. No.: 14/437,920

(22) PCT Filed: Feb. 26, 2014

(86) PCT No.: PCT/JP2014/054632
§ 371 (c)(1),
(2) Date: Apr. 23, 2015

(87) PCT Pub. No.: WO2015/128954
PCT Pub. Date: Sep. 3, 2015

(65) Prior Publication Data
US 2016/0299902 A1    Oct. 13, 2016

(51) Int. Cl.
*G06F 17/30* (2006.01)
*H04W 4/00* (2009.01)
(Continued)

(52) U.S. Cl.
CPC ...... *G06F 17/3056* (2013.01); *G06F 9/45558* (2013.01); *G06F 17/30554* (2013.01);
(Continued)

(58) Field of Classification Search
CPC ......... G06F 17/30554; G06F 17/30696; G06F 17/30864; G06F 17/30867
(Continued)

(56) References Cited

U.S. PATENT DOCUMENTS 7,299,160 B2    11/2007   Hamdan
8,385,971 B2 *   2/2013   Rhoads ............ G06F 17/30244
                                                              382/162
(Continued)

FOREIGN PATENT DOCUMENTS

JP    2005-260914 A    9/2005
JP    2011-118950 A    6/2011
(Continued)

OTHER PUBLICATIONS

Office Action issued in corresponding Japanese Application No. 2013-021109, mailed on Oct. 27, 2015 (6 pages).
(Continued)

*Primary Examiner* — Mark E Hershley
(74) *Attorney, Agent, or Firm* — Osha Liang LLP

(57) ABSTRACT

A device information providing system has a search request receiving unit that receives, as a search request for searching for a device, a search request including an output requirement for specifying a desired output result, a processing module DB in which information concerning a processing module that receives, as inputs, outputs from one or a plurality of other devices and combines the inputs to generate a new output is registered with respect to a plurality of the processing modules together with at least an input requirement for specifying an input of a processing module and an output requirement for specifying an output of the processing module, and a device DB in which information concerning the device is registered with respect to a plurality of the devices together with at least an output requirement for specifying an output of the device.

12 Claims, 8 Drawing Sheets

(51) Int. Cl.
*G06F 9/455* (2006.01)
*H04L 29/08* (2006.01)

(52) U.S. Cl.
CPC .. *G06F 17/30696* (2013.01); *G06F 17/30864* (2013.01); *G06F 17/30867* (2013.01); *H04L 67/12* (2013.01); *H04W 4/005* (2013.01); *G06F 2009/45595* (2013.01)

(58) Field of Classification Search
USPC .......................................................... 707/722
See application file for complete search history.

(56) References Cited

U.S. PATENT DOCUMENTS

| | | | | |
|---|---|---|---|---|
| 9,417,754 | B2* | 8/2016 | Smith | G06F 3/048 |
| 2006/0202834 | A1 | 9/2006 | Moriwaki | |
| 2006/0284839 | A1* | 12/2006 | Breed | B62D 1/046 |
| | | | | 345/156 |
| 2010/0250497 | A1* | 9/2010 | Redlich | F41H 13/00 |
| | | | | 707/661 |
| 2012/0069131 | A1* | 3/2012 | Abelow | G06Q 10/067 |
| | | | | 348/14.01 |
| 2012/0197852 | A1* | 8/2012 | Dutta | H04L 67/2804 |
| | | | | 707/692 |
| 2012/0197856 | A1* | 8/2012 | Banka | H04L 67/2885 |
| | | | | 707/706 |
| 2012/0197898 | A1* | 8/2012 | Pandey | H04L 67/12 |
| | | | | 707/741 |
| 2012/0197911 | A1* | 8/2012 | Banka | G06F 17/30864 |
| | | | | 707/752 |
| 2013/0050260 | A1* | 2/2013 | Reitan | G06F 3/011 |
| | | | | 345/633 |
| 2014/0063061 | A1* | 3/2014 | Reitan | G09G 3/003 |
| | | | | 345/633 |
| 2015/0256665 | A1* | 9/2015 | Pera | H04L 12/2803 |
| | | | | 455/420 |

FOREIGN PATENT DOCUMENTS

| | | |
|---|---|---|
| WO | 2013/024673 A1 | 2/2013 |
| WO | 2013/153890 A1 | 10/2013 |

OTHER PUBLICATIONS

T. Kawakami et al., "Distributed Sensor Information Management Architecture Based on Semantic Analysis of Sensing-Data", Multimedia, Distributed, Cooperative and Mobile Symposium (DICOMO2008) Collection of Papers, Japan, Information Processing Society of Japan, Jul. 11, 2008, vol. 2008, No. 1, pp. 1746-1753 (8 pages).
International Search Report issued in PCT/JP2014/054632 mailed on May 13, 2014 (1 page).
Written Opinion of the International Searching Authority issued in PCT/JP2014/054632 mailed on May 13, 2014 (5 pages).
Extended European Search Report in counterpart European Patent Application No. 14 85 4884.5 issued Sep. 9, 2016 (8 pages).

* cited by examiner

FIG. 2(a)

SEARCH CONDITION:

I would like to know weather in city of kusatsu.

SEARCH

FIG. 2(b)

REQUESTED DATA TYPE: Weather

SENSING TARGET AREA: City of kusatsu

SEARCH

FIG. 2(c)

SEARCH RESULT:

| ID | TYPE | TARGET AREA | CHARGE | .... |
|----|------|-------------|--------|------|
| xx | WEATHER | KUSATSU | xx YEN | .... |
| yy | WEATHER | KUSATSU | yy YEN | .... |
| zz | WEATHER | SOUTH DISTRICT OF SHIGA PREFECTURE | zz YEN | .... |
| ⋮ | | | | |

FIG. 2(d)

SEARCH CONDITION:

I would like to send an advertisement to people present in front of kyoto station.

SEARCH

FIG. 3

| DEVICE ID | DEVICE INFORMATION ||||| OUTPUT REQUIREMENT ||| CONTRACTUAL REQUIREMENTS |||
|---|---|---|---|---|---|---|---|---|---|---|---|
| | DEVICE ADDRESS | OWNER ID | SETTING PLACE | DEVICE TYPE | OUTPUT TYPE | TARGET AREA | CONSTRAINT | USAGE PATTERN | USAGE CHARGE | CONTRACT CONDITION |
| P001 | [IPv4] 192.0. 2.10 | U010 | Lon:12.3 Lat:34.5 H: 10.0 | MONITORING CAMERA | VIDEO | Circle(Lon :12.3, ··) | Only 8:00— 17:00/36 5day | Commercial 1 | 100YEN/MONTH | — |
| | | | | | | | | Academic 1 | Free | Resolution: QVGA, Academic purpose only |
| | | | | | | | | Academic 2 | 50YEN/MONTH | Resolution: VGA |
| | | | | | | | | Commercial 1 | 1000YEN/SEC | 17:00 – 21:00 on Weekdays |
| P002 | [IPv6] 2001:DB8:: 1D | U011 | Lat:34.990136 Lon:135.757713 H:30.0 | ELECTRONIC SIGNBOARD | IMAGE OUTPUT | Circle(Lat:34. 99, Lon:135.75, R: 20) | — | Commercial 2 | 300YEN/SEC | (21:00 – 17:00 on Weekdays) Or (Holidays) |
| P003 | [IPv6] 2001:DB8:: 3C85:72 | U012 | Lat:34.990136 Lon:135.757713 H:10.0 | SPEAKER | SOUND OUTPUT | Circle(Lat:34. 99, Lon:135.76, R: 10) | — | Commercial 1 | 100YEN/SEC | — |

FIG. 4

| PROCESSING ID | A001 | A002 | |
|---|---|---|---|
| CREATOR ID | U030 | U031 | |
| OUTPUT REQUIREMENT | OUTPUT TYPE | WEATHER | VIDEO BROADCAST | |
| | DEVICE TYPE | — | THEATER | |
| | TARGET AREA | FROM X1 CENTER RADIUS OF 10KM | FROM X1 CENTER RADIUS OF 10M | |
| | CONSTRAINT | ONLY IN HONSHU | — | |
| CONTRACTUAL REQUIREMENTS | USAGE PATTERN | 1 | 1 | |
| | USAGE CHARGE | 100YEN/TIME | — | |
| | CONTRACT CONDITION | — | — | |
| INPUT REQUIREMENTS 1 | TYPE | WEATHER MAP | IMAGE OUTPUT | |
| | DEVICE TYPE | — | — | |
| | CONSTRAINT | FROM X1 CENTER RADIUS OF 500KM | FROM X1 CENTER RADIUS OF 10M | |
| INPUT REQUIREMENTS 2 | | ... | SOUND OUTPUT | |
| ... | ... | | | |
| PROCESSING CONTENT | (PROCESSING PROGRAM) | | | |

FIG. 5

| DEVICE ID | ANALYSIS PROCESSING ID | DEVICE INFORMATION | | | | | OUTPUT REQUIREMENTS | | | CONTRACTUAL REQUIREMENTS | | |
|---|---|---|---|---|---|---|---|---|---|---|---|---|
| | | DEVICE ID OF INPUT 1 | DEVICE ID OF INPUT 2 | ⋮ | CREATOR ID | SETTING PLACE | DEVICE TYPE | OUTPUT TYPE | TARGET AREA | CONSTRAINT | USAGE PATTERN | USAGE CHARGE | CONTRACT CONDITION |
| V001 | A001 | P002 | P003 | | — | — | — | VIDEO BROADCAST | RADIUS OF 10M IN FRONT OF KYOTO STATION | — | COMMERCIAL 1 | 1100YEN/SEC | 17:00-21:00 ON WEEKDAYS |
| V002 | A002 | P021 | — | | — | — | — | WEATHER | WEATHER IN 10KM AROUND KUSATSU | — | 1 | 200YEN/TIME | — |
| | | | | | | | | | | | | | |

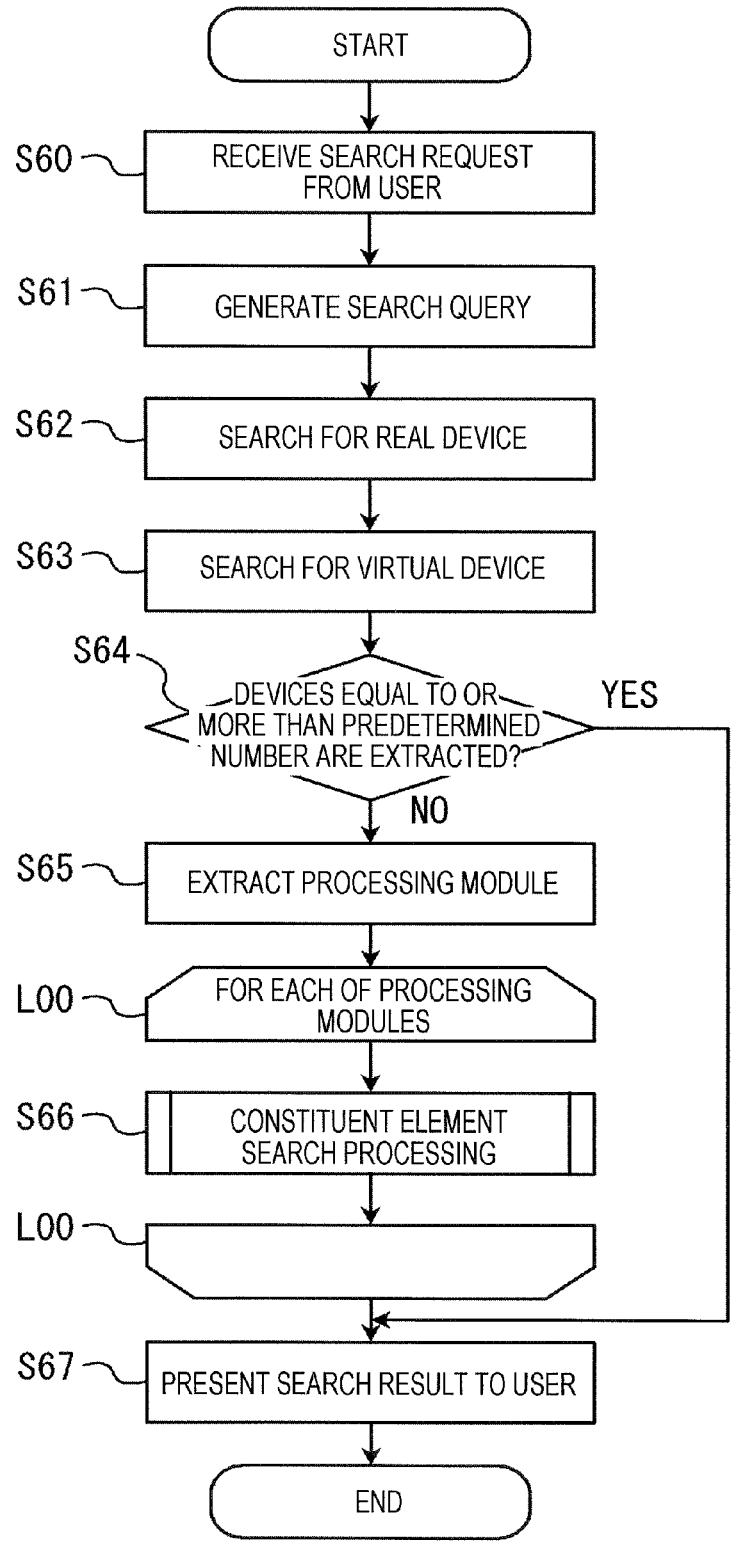

DEVICE INFORMATION PROVIDING SYSTEM AND DEVICE INFORMATION PROVIDING METHOD

BACKGROUND

Technical Field

The present invention relates to a technique for making it possible to easily find a device matching a purpose from among a large number of devices present in various places.

Related Art

As one means for realizing the ubiquitous society, a sensor network attracts attention. The sensor network is a technique for setting sensor devices, which have a detection function and a communication function, in various places and networking the sensor devices to enable collection, management, and seamless use of sensing data. If the sensor network is realized, it is easy to quickly and accurately grasp situations in all places from anywhere. Therefore, it is expected that the sensor network is not only applied to industrial fields such as manufacturing sites and physical distribution but also extensively applied to social systems such as transportation and various infrastructures and fields related to life such as medical and educational fields.

Incidentally, in the sensor network, there is an advantage that, as the number and types of sensors increase, abilities (resolution, the extent of a coverage area, types of sensing data that can be acquired, etc.) of the entire system are improved. On the other hand, if there are too many choices, there is a concern about harmful effects that it is difficult to find an optimum sensor in order to obtain target information and convenience is deteriorated. In a sensor network of Patent Literature 1, there is proposed a method in which a sensor managing system receives a sensor request of a user, searches for a sensor service corresponding to the sensor request, and provides the user with the sensor service.

CITATION LIST

Patent Literature

Patent Literature 1: Japanese Patent Application Laid-open No. 2005-260914

SUMMARY

The inventors focus on a technique called "virtual sensor" as one of possibilities of a sensor network. The virtual sensor is a sensor that analyzes and processes sensing data obtained from other sensors and outputs the sensing data as new sensing data. That is, the entity of the virtual sensor is a combination of one or a plurality of real sensors and a program module for performing data processing. If a sensor obtained by encapsulating the real sensors and the program module is prepared as the virtual sensor and provided to a user of the sensor network, the user can use the virtual sensor without distinguishing the virtual sensor from the real sensors. According to the introduction of such a virtual sensor, it is possible to expect various effects such as improvement of a rate of use of resources (the real sensors) and provision of sensing data having new added values.

Incidentally, as explained above, in realizing and spreading the sensor network service, it is important to implement a mechanism that makes it possible to easily search for a target sensor. Therefore, concerning the virtual sensor, in order to enable a search for the virtual sensor, it is desirable to define combinations of the real sensors and the program module, types of sensing data to be output, and the like and register information conceding the combinations, the types, and the like in a database for the search. However, there is an infinite number of ways of combination of the real sensors and processing methods for data. Whereas it is possible to create virtual sensors having various functions depending on ideas, it is realistically impossible to create all of the virtual sensors and register the virtual sensors in a database. However, if only registered limited types of virtual sensors can be used, it is wasteful if precious resources cannot be effectively utilized.

Note that the sensor network is explained as an example above. However, a network of an actuator (a controller) may encounter similar issues. The "sensor" and the "actuator (controller)" are common in performing some action for a target area in a predetermined range, although there is a difference concerning whether "a state is detected (acquired)" or "a state is changed". In the following explanation, as a concept encompassing the "sensor" and the "actuator", a term "device" is used. Note that, a virtual actuator means an actuator that combines outputs of a plurality of real actuators to generate new added values.

One or more embodiments of the present invention provides a technique for automatically generating a virtual device according to a request of a user to thereby increase the possibility that information concerning a device that satisfies the request of the user can be provided.

A device information providing system according to one or more embodiments of the present invention includes: a search request receiving unit that receives, as a search request for searching for a device, a search request including an output requirement for specifying a desired output result; a processing module DB in which information concerning a processing module that receives, as inputs, outputs from one or a plurality of other devices and combines the inputs to generate a new output is registered with respect to a plurality of the processing modules together with at least an input requirement for specifying an input of a processing module and an output requirement for specifying an output of the processing module; a device DB in which information concerning the device is registered with respect to a plurality of the devices together with at least an output requirement for specifying an output of the device; a processing module extracting unit that compares the output requirement included in the search request and output requirements of the processing modules, thereby extracting, from the processing module DB, a processing module capable of acquiring the desired output result designated by the search request; a virtual device generating unit that compares an input requirement of the extracted processing module and output requirements of the devices, thereby extracting, from the device DB, one or a plurality of devices having an output usable as an input to the extracted processing module and generates a virtual device composed of a combination of the extracted one or plurality of devices and the extracted processing module; and a device information providing unit that provides a user with, as a search result, information concerning the virtual device generated by the virtual device generating unit.

According to the configuration, a processing module capable of acquiring an output result desired by the user and a device having an output usable as an input to the processing module are automatically selected on the basis of a search request of the user and a virtual device is automatically generated. Therefore, even when a device matching a request of the user is absent (not registered in a database for search in advance), it is possible to meet the request of the user by creating a new virtual device. Therefore, it is possible to attain effective use of resources of a device network, an increase in opportunities of use by the user, and the like.

One or more embodiments of the present invention includes a device extracting unit that compares the output requirement included in the search request and the output requirements of the devices, thereby extracting, from the device DB, a device capable of acquiring the desired output result designated in the search request, and the device information providing unit provides the user with, as a search result, information concerning the device extracted by the device extracting unit. Consequently, it is possible to provide the user with both of information concerning an existing device registered in the device DB and information concerning a new virtual device generated by the virtual device generating unit. For the user, it is possible to search for the existing device and the virtual device without distinguishing the existing device and the virtual device. Therefore, convenience is improved. Further, it is also possible to expect rationalization of a system configuration by utilizing the device DB as a database for search for the existing device.

According to one or more embodiments of the present invention, extraction processing for extracting a device by the device extracting unit is performed more preferentially than extraction processing for extracting the processing module by the processing module extracting unit and generation processing for generating a virtual device by the virtual device generating unit. Since the virtual device uses outputs of the other devices, the virtual device sometimes has disadvantages that, compared with the existing device, costs of use are high, a processing load is large, and accuracy is deteriorated by data processing. Therefore, if there is an existing device that satisfies a request of the user, it is appropriate to preferentially provide information concerning the existing device. There is also an advantage that time required until a search result is provided to the user can be reduced and a high-speed search can be realized by first performing the extraction processing for a device, which is light processing compared with extraction processing for a processing module and the generation processing for a virtual device.

According to one or more embodiments of the present invention, only when an extraction result of the device by the device extracting unit does not meet a predetermined condition, the extraction processing for extracting a processing module by the processing module extracting unit and the generation processing for generating a virtual device by the virtual device generating unit are performed. "The extraction result of the device does not meet the predetermined condition" when, for example, a device is not extracted or the number of extracted devices is smaller than a predetermined number. According to this configuration, when an extraction result of an existing device is satisfactory, since the extraction processing for a processing module and the generation processing for a virtual device are not executed, it is possible to reduce a processing load on the system.

According to one or more embodiments of the present invention, the device DB includes a real device DB in which information concerning physically present real devices is registered and a virtual device DB in which information concerning virtual devices is registered. Consequently, a device is searched from three categories of the existing real devices registered in the real device DB, the existing virtual devices registered in the virtual device DB, and virtual devices to be generated anew. Therefore, it is possible to further increase the possibility that information concerning a device matching a request of the user can be provided.

According to one or more embodiments of the present invention, the virtual device generating unit extracts, out of the real devices registered in the real device DB and the virtual devices registered in the virtual device DB, a device having an output usable as an input to the extracted processing module. Consequently, it is possible to use an existing virtual device as an input of a new virtual device. Therefore, a degree of freedom in creating a virtual device is greatly expanded. Therefore, it is possible to further increase the possibility that a virtual device matching a request of the user can be generated.

According to one or more embodiments of the present invention, when a new virtual device is generated by the virtual device generating unit, information concerning the new virtual device is automatically registered in the virtual device DB. If information concerning a virtual device once generated is registered in the virtual device DB, when a similar search request is received from another user, it is possible to cope with the search request only by performing a search through the virtual device DB without performing the generation processing for a virtual device. Therefore, it is possible to reduce a processing load on the system.

One or more embodiments of the present invention comprises a device information providing system including at least any one of the means explained above or can be grasped as a device network system configured from the device information providing system and a plurality of devices. A device information providing method according to one or more embodiments of the present invention includes at least any one of the means explained above or can be grasped as a program for causing a computer to execute steps of the device information providing method or a storage medium having the program recorded therein.

According to one or more embodiments of the present invention, by automatically generating a virtual device according to a request of a user, it is possible to increase the possibility that information concerning a device satisfying a request of the user can be provided.

BRIEF DESCRIPTION OF THE DRAWINGS

FIGS. 2(a)-2(d) are diagrams showing examples of use of device search processing.

FIG. 3 is a diagram showing a configuration example of a physical device master DB.

FIG. 4 is a diagram showing a configuration example of an algorithm master DB.

FIG. 5 is a diagram showing a configuration example of a virtual device master DB.

FIG. 6 is a flowchart showing a flow of device search processing.

DETAILED DESCRIPTION

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<System Configuration>

Figure 1:
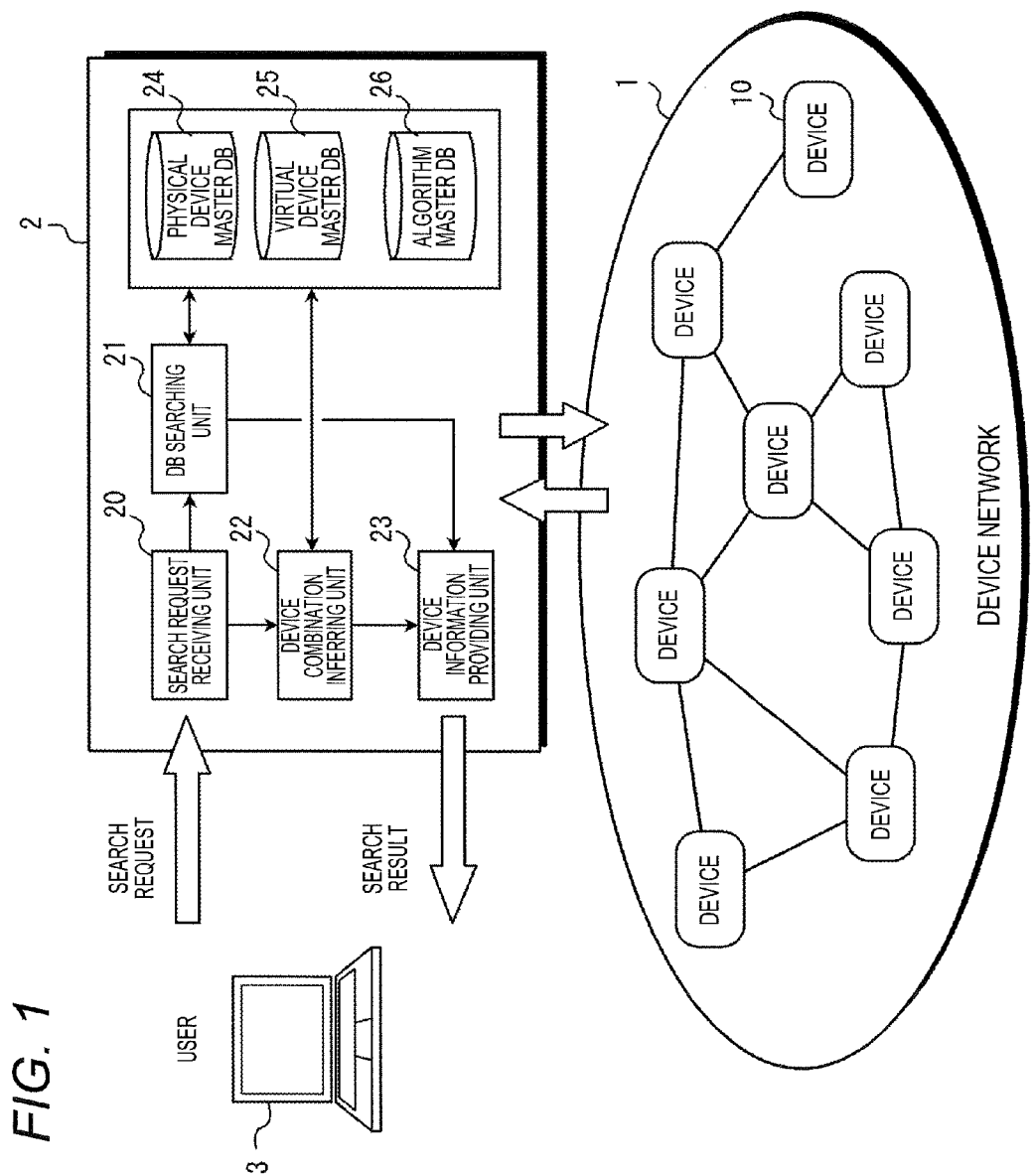
FIG. 1 is a diagram showing the configuration of a device network system.

A configuration example of a device network system according to one or more embodiments of the present invention is explained with reference to FIG. 1.

The device network system is configured from a device network 1 and a device managing system 2. The device network 1 is a network configured by a large number of devices 10 present in various places. A configuration, a communication system, and the like of the network can be arbitrarily designed and are not particularly limited. The respective devices 10 are capable of communicating with the device managing system 2 via a wide area network such as the Internet. The device managing system 2 is a server apparatus that manages information concerning the devices 10 configuring the device network 1 and information and the like collected from the devices and provides various services (a device search is one of the services) for a user who desires to use the device 10. The user can access the services provided by the device managing system 2 from a user terminal 3 through the wide area network such as the Internet. A device information providing system and a device information providing method according to one or more embodiments of the present invention are implemented as a function of the device managing system 2.

Incidentally, not all of operators of the device managing system 2 own the various devices 10 configuring the device network 1. A larger number of entities such as individuals and corporations separate from the operators could own or operate and manage devices (a person who owns or operates and manages a device is referred to as "owner of the device"). Therefore, the device managing system 2 has, as functions for the owner of the device, a function of registering a new device in this system and a function of changing information concerning the device. The device managing system 2 also provides, as a function for an outsider, a function of creating and registering a virtual device explained below and a processing module used in the virtual device. A person who creates and registers the virtual device and the processing module is referred to as "creator". Although not explained in detail, the device managing system 2 according to one or more embodiments of the present invention has a function of mediating between a user and the owner or the creator of the device (collation and arbitration of use conditions and provision conditions, charging to the user and payment of prices to the owner or the creator, and the like).

The respective devices 10 are devices acting on a target area specified by a space or a spacetime and can be roughly divided into a "sensor" and an "actuator". The "space" is an area specified by two dimensions (x, y) or three dimensions (x, y, z). The "spacetime" refers to an area obtained by adding a dimension of "time (t)" to the "space", that is, an area specified by the three dimensions (x, y; t) or four dimensions (x, y, z; t). Note that, in this specification, the term "sensor" is used to mean a device that detects (acquires) a state of the target area. The term "actuator" is used to mean a device that changes the state of the target area. For example, an image sensor (a camera), a temperature sensor, a humidity sensor, an illuminance sensor, a force sensor, a sound sensor, an RFID sensor, an infrared sensor, an attitude sensor, a rainfall sensor, a radiation sensor, and a gas sensor correspond to the sensor described above. In this system, any kinds of sensors can be used. For example, a motor, a solenoid, a controller, a robot, a light, a speaker, a display, a digital signage, and an air conditioner correspond to the actuator. In this system, any kinds of actuators can be used. There are also devices including both of the sensor (an image sensor, etc.) and an actuator (a display, a speaker, etc.) such as a cellular phone, a smartphone, and a slate device. It is possible to mix various kinds of devices in the device network 1.

The device managing system 2 includes, as functions concerning a search for a device and information provision, functions such as a search request receiving unit 20, a DB search unit 21, a device combination inferring unit 22, a device information providing unit 23, a physical device master DB 24, a virtual device master DB 25, and an algorithm master DB 26. In terms of hardware, the device managing system 2 can be configured by a computer including a CPU, a main storage device (a memory), an auxiliary storage device (a HDD, a SSD, etc.), a communication device, an input device, and a display device. Functional blocks shown in FIG. 1 are embodied by loading a computer program stored in the auxiliary storage device to the main storage device and the CPU executing the program. Note that the device managing system 2 may be configured by a single computer or can be configured by a plurality of computers that cooperate with one another.

As the user terminal 3, for example, a personal computer, a cellular phone, a smartphone, and a slate device can be used. Note that, in one or more of the above embodiments, the user performs a device search through the Internet. However, it is also possible to adopt a configuration in which the user operates the device managing system itself or a part or all of functions of the device managing system are implemented on the user terminal 3 side.

<Device Information Providing Service>

A device information providing service provided by the device managing system 2 is explained in detail below. The device information providing service is a search service for facilitating the user to find a device optimum for attaining a purpose out of a large number of devices 10 configuring the device network 1. This service is available as a sensor information providing service for searching for a sensor and as an actuator information providing service for searching for an actuator. First, specific examples of use of the sensor information providing service are explained with reference to FIG. 2(a) to FIG. 2(c).

When the user accesses the device information providing service using the user terminal 3, a search condition input screen shown in FIG. 2(a) is displayed. On this screen, a search condition (a purpose of a search) can be input as a free sentence such as "I would like to know a weather condition in the city of Kusatsu". FIG. 2(b) is another example of the search condition input screen. In the case of this screen, a desired type of sensing data and a sensing targeted area are input to separate boxes. When a search button is pressed, a search request is transmitted from the user terminal 3 to the device managing system 2. Device search processing is executed in the device managing system 2. Details of the device search processing are explained below.

FIG. 2(c) is an example of a search result screen returned from the device managing system 2. In this example, two kinds of sensors capable of acquiring the weather in the city of Kusatsu are presented. Further, a sensor capable of acquiring the weather in the southern district of Shiga Prefecture where the city of Kusatsu is present is also presented. In this way, in the device information providing service, a plurality of sensors likely to meet search conditions input by the user are retrieved and displayed in a list in order from the sensor having the highest degree of matching with the search conditions. In this search result list, information such as specifications of devices, amounts of use, and providers of the devices is also displayed according to necessity. The user can view a search result and select a sensor to be used while comparing and examining the sensor.

FIG. 2(d) shows an example of an actuator information providing service. On a search condition input screen shown in FIG. 2(d), a condition (a purpose) "I would like to send an advertisement to people present in front of Kyoto station" is input. As means for transmitting information to people present in front of the station, for example, a digital signage (DS), a speaker, and an a large display and an electronic signboard set in a building in the neighborhood are conceivable. As a search result, these usable devices (actuators) are displayed as a list.

(Virtual Device)

The device information providing service of this system has a characteristic in providing, as a search result, not only information concerning physically present real devices (real sensors and real actuators) but also information concerning virtual devices (virtual sensors and virtual actuators). The virtual device means an imaginary device configured by a combination of one or a plurality of devices and a processing module.

For example, it is assumed that a search request from the user is "a camera image of a Kyoto Station front concourse". If a monitoring camera that photographs the Kyoto Station front concourse and opens a photograph thereof to the public is present in the device network 1, first, information concerning the monitoring camera (a real device) only has to be provided to the user. However, when a real device completely matching the search request from the user is absent or, even if the real device is present, information concerning other devices is sometimes provided as second and third candidates. For example, when a camera that photographs the entire Kyoto Station front concourse is absent but a plurality of monitoring cameras that partially photograph places of the concourse are present, a device obtained by combining the plurality of monitoring cameras and a processing module that panoramically combines a plurality of camera videos and outputs a video in a wide range can be provided as a virtual sensor. Similarly, when a visible monitoring camera that photographs the Kyoto Station front concourse in the daytime and a far infrared camera that photographs the Kyoto Station front concourse at night are present, a device obtained by combining the cameras and a processing module that selects a clearly taken video out of a plurality of camera videos can be presented as a virtual sensor.

It is assumed that a search request from the user is "directions in which people exiting the front ticket gate of Kyoto Station walk in the morning of the weekday and the number of people". It is rare that a real sensor that can directly obtain such special sensing data is set. Even in this case, for example, if a monitoring camera that photographs the front ticket gate and a monitoring camera that photographs the vicinity of the ticket gate are present, by combining the monitoring cameras, a processing module that identifies the same person from a plurality of images, and a processing module that performs count of the number of people by direction, it is possible to configure a virtual sensor that satisfies the search request of the user.

In the case of the virtual actuator, outputs of a plurality of actuators are combined (synchronized or associated). For example, it is assumed that a search request from the user is "I would like to broadcast a video to people present in front of Kyoto Station". In this case, for example, by synchronizing a video output by a large electronic signboard set in a building in front of Kyoto Station and sound outputs by a plurality of speakers set in front of Kyoto Station, it is possible to provide a virtual actuator capable of outputting a moving image with sound.

As it is seen from this example, by enabling use of the virtual devices (the virtual sensor and the virtual actuator) in this system, it is possible to expect various effects such as improvement of a rate of use of resources (real devices) of the device network 1 and provision of sensing data or actuator outputs having a new added value.

(Database Structure)

The structures of databases used in the device information providing service are explained. FIGS. 3 to 5 are diagrams respectively showing configuration examples of the physical device master DB 24, the algorithm master DB 26, and the virtual device master DB 25.

(1) Physical Device Master DB

The physical device master DB 24 is a database in which information concerning physically present real devices (real sensors and real actuators) is registered. The physical device master DB 24 is also referred to as real device DB. In the physical device master DB 24, information concerning all the devices 10 configuring the device network 1 is registered. Device registration in the physical device master DB 24 is performed by owners of the devices 10 or an operator of this system. In FIG. 3, registered contents of a "monitoring camera", which is an example of a sensor, and an "electronic signboard" and a "speaker", which are examples of an actuator, are illustrated.

A "device ID" is information for identifying a device. A different ID is allocated to each of devices. "Device information" is a portion in which basic information of the device is described. The "device information" includes information such as a "device address" (a network address in performing communication with the device; e.g., an IP address), an "owner ID" (information for identifying an owner of the device), a "setting place" (information for specifying a place where the device is set; e.g., latitude and longitude information), and a "device type" (information indicating a type or a use of a sensor or an actuator; e.g., a monitoring camera, a temperature sensor, or an electronic signboard).

"Output requirements" are information for specifying an output of the device. In the case of a sensor, the "output requirements" include, as information concerning sensing data output from the sensor, information such as an "output type" (information indicating a data type of the sensing data; e.g., a video, an image, weather, and temperature), a "target area" (information for specifying a target area of sensing; in the case of one point, latitude and longitude and, in the case of an area; latitude and longitude+radius of the center), and a "constraint" (e.g., a period of time and a period when an output is obtained). On the other hand, in the case of an actuator, the "output requirements" include, as information concerning an output from the actuator, information such as an "output type" (information indicating an output form of the actuator; e.g., an image output, a sound output, and a thermal output), a "target area" (information for specifying an area affected by the output of the actuator; e.g., in the case of one point, latitude and longitude and, in the case of an area, latitude and longitude+radius of the center), and a "constraint" (e.g., a period of time and a period when the actuator is usable).

"Contractual requirements" are information indicating usage condition in use of the device. A "usage charge" and a "contract condition" are set for each of one or a plurality of "usage patterns" concerning devices. In the example shown in FIG. 3, concerning a monitoring camera with a device ID "P001", three kinds of usage patterns explained below are prepared.

Commercial 1: The usage charge is 100 yen per month. No contract condition.

Academic 1: The usage charge is free. However, resolution is limited to QVGA. Limited to an academic use.

Academic 2: The usage charge is 50 yen per month. However, resolution is limited to VGA.

(2) Algorithm Master DB

The algorithm master DB 26 is a database in which information concerning processing modules used in virtual devices is registered. The algorithm master DB 26 is also referred to as processing module DB. The processing module means an algorithm or a rule for receiving, as inputs, outputs from one or a plurality of devices and combining the inputs to generate a new output. Creation and registration of a processing module are performed by a creator of the processing module or the operator of this system. In FIG. 4, a processing module that predicts weather on the basis of data of a weather map obtained from one sensor and a processing module that combines two actuator outputs, i.e., an image output and a sound output to realize a video broadcast are illustrated.

A "processing ID" is information for identifying a processing module. A different ID is allocated to each of processing modules. A "creator ID" is information for identifying a creator of the processing module. When the processing module is used, a price corresponding to a contractual condition explained below is paid to the creator of the processing module.

"Output requirements" are information for specifying an output of the processing module. Basically, information in forms same as the "output requirements" of the physical device master DB 24 is registered. However, concerning the "target area", the target area can also be defined by not only a fixed value such as latitude and longitude but also a relative position based on a position described by a variable (X1) such as "an area of a radius of 10 km centering on a coordinate X1". If a position in a real space of a device combined with the processing module is determined, a value of the variable is decided on the basis of the target area of the device.

"Contractual requirements" are information indicating usage condition in use of the processing module. A "usage charge" and a "contract condition" are set for each of one or a plurality of "usage patterns" concerning processing modules.

"Input requirements" are information for specifying an input of the processing module. One or more input requirements are defined for one processing module. The input requirements include information such as a "type" (in the case of a sensor, a data type of sensing data and, in the case of an actuator, an output form of the actuator), a "device type" (information indicating a type or a use of the sensor or the actuator), and a "constraint" (in the case of the sensor, a target area, a period of time, a period, and the like of sensing and, in the case of the actuator, a range, a period of time, a period, and the like affected by an output of the actuator).

"Processing content" is information such as a processing program for analyzing and processing sensing data obtained from the sensor and a processing program for controlling the actuator. For example, a URI or the like indicating a storage destination of the processing program is registered.

(3) Virtual Device Master DB

The virtual device master DB 25 is a database in which information concerning virtual devices (virtual sensors and virtual actuators) is registered. The virtual device master DB 25 is also referred to as virtual device DB. In the virtual device master DB 25, information concerning a plurality of virtual devices can be registered. Creation and registration of a virtual device is performed by a creator of the virtual device or the operator of this system in some case and is dynamically performed in device search processing in other cases as explained below. In FIG. 5, registered contents of an example (ID: V001) of a virtual sensor that senses the weather in 10 km around Kusatsu and an example (ID: V002) of a virtual actuator that performs a video broadcast to an area of a radius of 10 m in front of a station today are illustrated.

A "device ID" is information for identifying a device. A different ID is allocated to each of devices. Naturally, device IDs do not overlap between a virtual device and a real device.

"Device information" is a portion in which basic information of a virtual device is described. The "device information" includes information such as a "processing ID", a "device ID of an input 1", a "device ID of an input 2", . . . , a "creator ID", a "setting place", and a "device type". The processing ID is an ID of a processing module used in the virtual device. A device ID of an input n is an ID of another device used as an input. One or more input devices are registered. The creator ID is an ID indicating a creator of the virtual device. The setting place is information indicating an imaginary setting place of the virtual device. The device type is information indicating an imaginary device type of the virtual device. The creator ID, the setting place, and the device type are sometimes undefined (e.g., when the virtual device is dynamically generated by this system, the creator ID is undefined).

"Output requirements" are information for specifying an output of the virtual device. "Contractual requirements" are information related to a usage contract of the virtual device. The "output requirements" and the "contractual requirements" are information having significances same as the significances of the information having the same names in the physical device. Therefore, explanation of the "output requirements" and the "contractual requirements" is omitted.

(The Device Search Processing)

Figure 7:
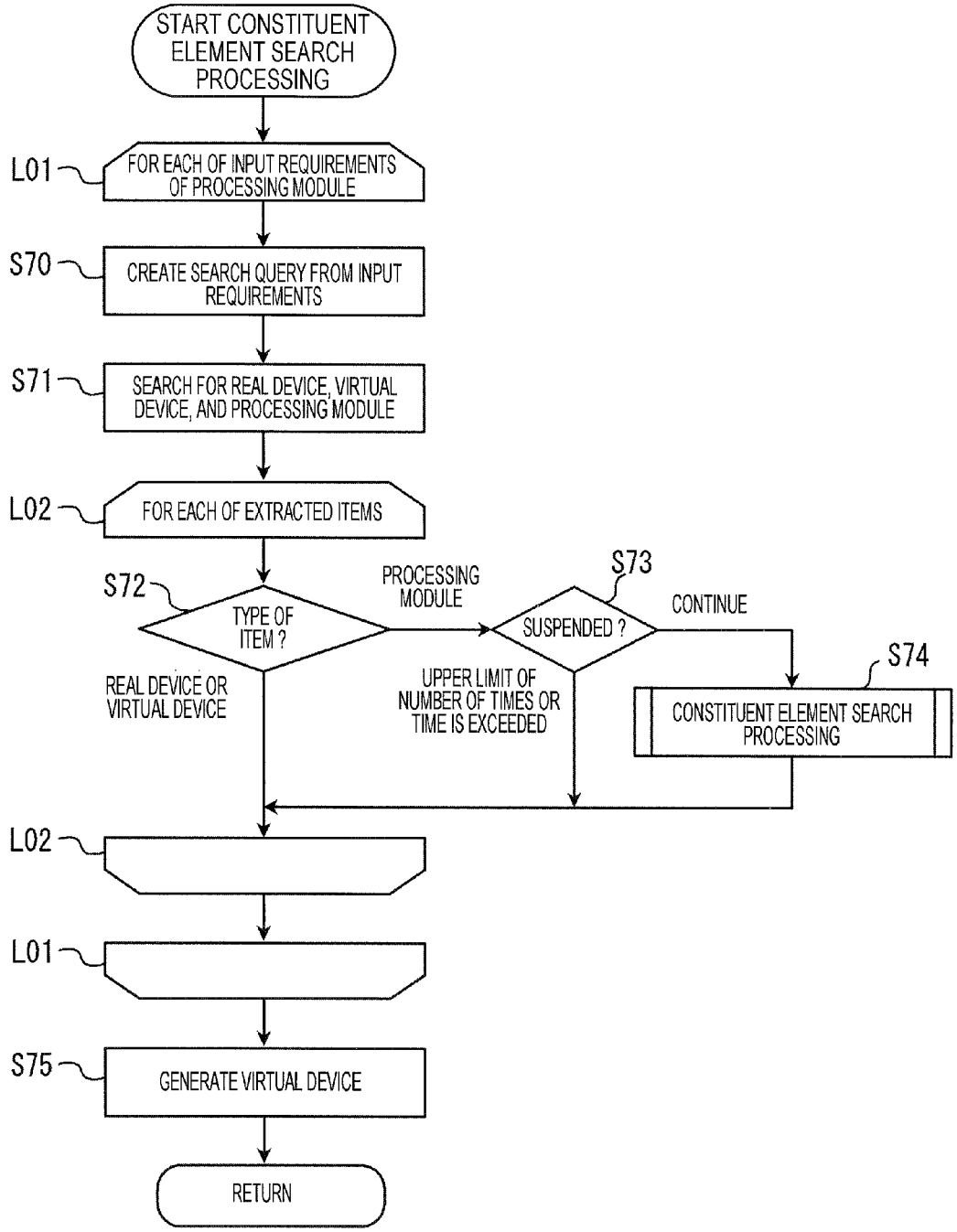
FIG. 7 is a flowchart for explaining details of constituent element search processing.
Figure 8:
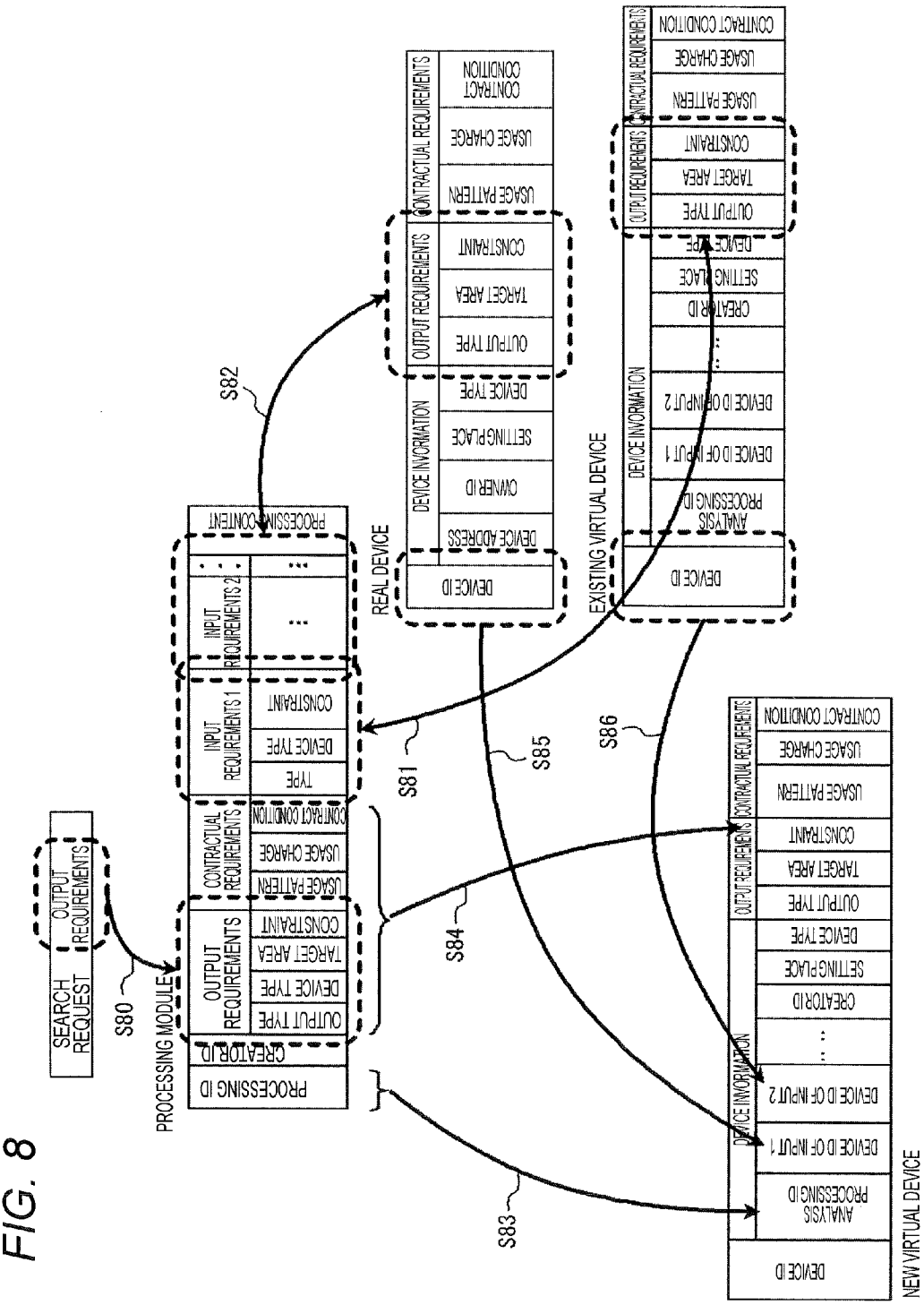
FIG. 8 is a diagram for explaining a procedure for dynamically generating a virtual device.

Subsequently, the device search processing by the device managing system 2 is explained with reference to FIGS. 6 to 8. FIG. 6 is a flowchart for explaining an overall flow of the device search processing. FIG. 7 is a flowchart for explaining details of constituent element search processing invoked in the device search processing. FIG. 8 is a diagram for explaining a procedure for dynamically generating a virtual device.

First, the search request receiving unit 20 acquires a search request from the user terminal 3 (step S60). The search request receiving unit 20 extracts, out of the search request, information (output requirements) for specifying an output result desired by the user and generates a search query (step S61). For example, when a search request "I would like to know the weather in the city of Kusatsu" is given as shown in FIG. 2(*a*), the search request receiving unit 20 performs a morphological analysis or a semantic analysis to extract information "weather" indicating a data type and information "the city of Kusatsu" indicating a target area out of a text of the search request and generates a search query including output requirements "the data type: weather, the target area: city of Kusatsu".

Subsequently, the DB search unit 21 executes a search through the physical device master DB 24 on the basis of the search query (step S62). Specifically, the DB search unit 21 compares contents of the output requirements included in the search query and contents of the output requirements included in the records of the devices in the physical device master DB 24 and extracts a real device capable of acquiring a desired output result designated by the search request. For example, when the output requirements of the search query are "the data type: weather, the target area: city of Kusatsu", if the output type of a device coincides with or similar to "weather" and a target area of the device coincides with or includes "the city of Kusatsu", the device is extracted.

The DB search unit 21 executes the same search on the virtual device master DB 25 (step S63). In this case, as in the case explained above, the DB search unit 21 compares the contents of the output requirements included in the search query and contents of the output requirements included in the records of the virtual devices of the virtual device master DB 25 to extract a virtual device corresponding to the search query. When the number of devices extracted by the search processing in steps S62 and S63 is equal to or larger than the threshold, the processing proceeds to provision processing for a search result and, when the number of extracted devices is smaller than the number of extracted devices, the processing proceeds to dynamic generation processing for a virtual device (step S64). The threshold can be arbitrarily set. For example, if the threshold is set to 1, when at least one real device or virtual device satisfying the search request of the user is found by the DB search, the dynamic generation processing for a virtual device is skipped. Conversely, if the threshold is set to an extremely large value, the dynamic generation processing for a virtual device can be controlled to be always performed. Note that the search processing in step S62 and the search processing in S63 may be executed in parallel.

The dynamic generation processing for a virtual device by the device combination inferring unit 22 is explained. First, the device combination inferring unit 22 performs processing module extraction processing (step S65). In the processing module extraction processing, the device combination inferring unit 22 compares the contents of the output requirements included in the search query and contents of the output requirements included in the records of the processing modules of the algorithm master DB 26 to extract a processing module capable of acquiring the output result desired by the user. For example, when the output requirements of the search query are "the data type: weather, the target area: the city of Kusatsu", if the output type of a processing module coincides with or similar to "weather" and "the city of Kusatsu" can be included in a range determined by the target area and constraints, the processing module is extracted. Note that, when the target area is defined by a variable as "a radius of 10 km from an X1 center" as in the processing module (A001) in FIG. 4, the device combination inferring unit 22 only has to determine whether the requirements are satisfied after applying the coordinate of the center point of the city of Kusatsu to the variable X1.

The device combination inferring unit 22 executes the constituent element search processing on the extracted processing module (step S66). The constituent element search processing is processing for comparing input requirements of the processing module and output requirements of devices to thereby extract a device having an output usable as an input to the processing module and combines the device and the processing module to generate a new virtual device. Arguments of the constituent element search processing are the search query and an ID of the processing module. A return value is a list of generated virtual devices. A loop L00 indicates that, when one or more processing modules are extracted, the same processing is repeated for each of the processing modules.

A detailed flow of the constituent element search processing is shown in FIG. 7. A loop L01 indicates that the same processing is repeated for each of input requirements included in the processing module. First, when the device combination inferring unit 22 extracts a first input requirement from the processing module, the device combination inferring unit 22 generates a new search query from contents of the "type" and the "constraint" of the input requirement and contents of the original search query (step S70). For example, in the case of the processing module (A001) shown in FIG. 4, the "type" of the input requirement is a "weather map" and the "constraint" is "a radium 500 km in an X1 center". Therefore, a search query including contents "the data type: a weather map, the target area: a radius of 500 km from the center of the city of Kusatsu" is generated.

Subsequently, the device combination inferring unit 22 searches through each of the physical device master DB 24, the virtual device master DB 25, and the algorithm master DB 26 using the search query generated in step S70 (step S71). Search processing in this step is the same as the search processing explained in steps S62, S63, and S65. As a result, a real device, a virtual device, and a processing module satisfying the search query "the data type: a weather map, the target area: a radius of 500 km from the center of the city of Kusatsu" are extracted (the extracted devices and the extracted module are referred to as items).

In a loop L02, the same processing is repeated for each of the items extracted in step S71. That is, the device combination inferring unit 22 determines which of the real device, the virtual device, and the processing module a target item is (step S72). When the target item is the processing module, the device combination inferring unit 22 recursively executes the constituent element search processing (step S74). Note that, in order to prevent the recursive processing from infinitely continuing, in step S73, the device combination inferring unit 22 determines that the recursive processing is stopped when the number of times of searches or a search time exceeds an upper limit By repeating steps S72 to S74 for all the items (the loop L02), a list of devices (real devices and virtual devices) that can meet the first input requirement of the processing module is obtained.

Further, the processing is repeated for all the input requirements of the processing modules (the loop L01), whereby a list of devices is obtained for each of the input requirements of the processing module. Thereafter, the device combination inferring unit 22 generates a virtual device from the processing module and the list of the devices for each of the input requirements (step S75). In this case, virtual devices may be generated concerning all combinations of devices. Alternatively, only one virtual device may be generated by selecting representative devices concerning the input requirements (e.g., in the priority order of a real device>an existing virtual device>a virtual device generated anew in step 74).

FIG. 8 schematically shows a procedure for dynamically generating a virtual device on the basis of a search request of the user. As shown in FIG. 8, first, according to comparison of output requirements included in the search request and output requirements of processing modules, a processing module capable of acquiring an output result desired by the user is extracted (S80). Subsequently, according to comparison of input requirements of the processing module and output requirements of devices, a device having an output corresponding to the input requirements is extracted (S81 and S82). Then, it is possible to generate a record of a new virtual device from a processing ID, output requirements, and contractual requirements of the extracted processing module (S83 and S84) and a device ID of the extracted device (S85 and S86).

When the generation of a virtual device is performed concerning all the processing modules extracted in step S65, the processing leaves the loop L00. Thereafter, the device information providing unit 23 creates a device list in which the real devices extracted in step S62, the virtual devices extracted in step S63, and the new virtual devices generated in step S66 are collected. The device list is transmitted from the device information providing unit 23 to the user terminal 2 and presented to the user as a search result (step S67). The search processing for a device is completed.

According to one or more of the above embodiments, a processing module capable of acquiring an output result desired by the user and a device having an output usable as an input to the processing module are automatically selected on the basis of a search request of the user and a virtual device is automatically generated. Therefore, even when a device matching a request of the user is absent (not registered in a database for search in advance), it is possible to meet the request of the user by creating a new virtual device. Therefore, it is possible to attain effective use of resources of resources of a device network, an increase in opportunities of use by the user, and the like. For the user, it is possible to search for an existing device and a virtual device without distinguishing the existing device and the virtual device. Therefore, convenience is improved. A device is searched from three categories of the existing real devices registered in the physical device master DB, the existing virtual devices registered in the virtual device master DB, and virtual devices to be generated anew. Therefore, it is possible to further increase the possibility that information concerning a device matching a request of the user can be provided.

In one or more embodiments of the present invention, the search for a real device and the search for an existing virtual device are preferentially executed (steps S62 and S63). The generation processing for a virtual device (steps S65 to S66) is performed only when a result of the searches is insufficient. Consequently, it is possible to reduce a frequency of occurrence of the virtual device generation processing, in which a more processing load is applied compared with a DB search. It is possible to reduce a processing load on the system.

In one or more embodiments of the present invention, another virtual device can be used as an input to a virtual device. Therefore, a degree of freedom in creating a virtual device is greatly improved. Therefore, it is possible to further increase the possibility that a virtual device matching a request of the user can be generated.

The embodiments described above are merely specific examples of the present invention and are not limiting. For example, in step S75, the device combination inferring unit 22 may automatically register the information concerning the virtual device generated anew in the virtual device master DB 25. If the information concerning the virtual device generated once is registered in the virtual device master DB 25, when a similar search request is received from another user, it is possible to cope with the search request only with the search through the virtual device DB (step S63) without performing the generation processing for a virtual device (steps S65 to S66). Therefore, it is possible to reduce a processing load on the system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1: Device network
2: Device managing system
3: User terminal
10: Device
20: Search request acquiring unit
21: DB search unit
22: Device combination inferring unit
23: Device information providing unit
24: Physical device master DB
25: Virtual device master DB
26: Algorithm master DB

The invention claimed is:

1. A device information providing system comprising:
hardware comprising:
   a search request receiving unit that receives, as a search request for searching for a device, a search request including an output requirement for specifying a desired output result;
   a processing module database (DB) in which information concerning a processing module that receives, as inputs, outputs from one or a plurality of other devices and combines the inputs to generate a new output is registered with respect to a plurality of the processing modules together with at least an input requirement for specifying an input of a processing module and an output requirement for specifying an output of the processing module;
   a device database (DB) in which information concerning the device is registered with respect to a plurality of the devices together with at least an output requirement for specifying an output of the device;
   a processing module extracting unit that compares the output requirement included in the search request and output requirements of the processing modules, thereby extracting, from the processing module DB, a processing module capable of acquiring the desired output result designated by the search request;
   a virtual device generating unit that compares an input requirement of the extracted processing module and output requirements of the devices, thereby extracting, from the device DB, one or a plurality of devices having an output usable as an input to the extracted processing module and generates a virtual device composed of a combination of the extracted one or plurality of devices and the extracted processing module; and
   a device information providing unit that provides a user with, as a search result, information concerning the virtual device generated by the virtual device generating unit.

2. The device information providing system according to claim 1, further comprising:
   a device extracting unit that compares the output requirement included in the search request and the output requirements of the devices, thereby extracting, from the device DB, a device capable of acquiring the desired output result designated in the search request, wherein the device information providing unit provides the user with, as a search result, information concerning the device extracted by the device extracting unit.

3. The device information providing system according to claim 2, wherein extraction processing for extracting a device by the device extracting unit is performed more preferentially than extraction processing for extracting the processing module by the processing module extracting unit and generation processing for generating a virtual device by the virtual device generating unit.

4. The device information providing system according to claim 3, wherein, only when an extraction result of the device by the device extracting unit does not meet a predetermined condition, the extraction processing for extracting a processing module by the processing module extracting unit and the generation processing for generating a virtual device by the virtual device generating unit are performed.

5. The device information providing system according to claim 1, wherein the device DB includes a real device database (DB) in which information concerning physically present real devices is registered and a virtual device database (DB) in which information concerning virtual devices is registered.

6. The device information providing system according to claim 5, wherein the virtual device generating unit extracts, out of the real devices registered in the real device DB and the virtual devices registered in the virtual device DB, a device having an output usable as an input to the extracted processing module.

7. The device information providing system according to claim 5, wherein, when a new virtual device is generated by the virtual device generating unit, information concerning the new virtual device is automatically registered in the virtual device DB.

8. A device information providing system comprising:
hardware comprising:
a search request receiving unit that receives, as a search request for searching for a sensor, a search request including a data requirement for specifying desired sensing data;
a processing module database (DB) in which information concerning a processing module that processes one or a plurality of sensing data and generates new sensing data is registered with respect to a plurality of the processing modules together with at least an input requirement, which is a data requirement of sensing data used as an input, and an output requirement, which is a data requirement of new sensing data to be generated;
a sensor database (DB) in which information concerning the sensor is registered with respect to a plurality of the sensors together with at least an output requirement, which is a data requirement of sensing data to be output;
a processing module extracting unit that compares the data requirement included in the search request and output requirements of the processing modules, thereby extracting, from the processing module DB, a processing module capable of generating the desired sensing data designated by the search request;
a virtual sensor generating unit that compares an input requirement of the extracted processing module and output requirements of the sensors, thereby extracting, from the sensor DB, one or a plurality of sensors capable of acquiring sensing data to be used as an input to the extracted processing module and generates a virtual sensor composed of a combination of the extracted one or plurality of sensors and the extracted processing module; and
a sensor information providing unit that provides a user with, as a search result, information concerning the virtual sensor generated by the virtual sensor generating unit.

9. A device information providing method executed via a computer comprising:
a processing module database (DB) in which information concerning a processing module that receives, as inputs, outputs from one or a plurality of other devices and combines the inputs to generate a new output is registered with respect to a plurality of the processing modules together with at least an input requirement for specifying an input of a processing module and an output requirement for specifying an output of the processing module; and
a device database (DB) in which information concerning the device is registered with respect to a plurality of the devices together with at least an output requirement for specifying an output of the device,
the method comprising:
receiving, as a search request for searching for a device, a search request including an output requirement for specifying a desired output result;
comparing the output requirement included in the search request and output requirements of the processing modules, thereby extracting, from the processing module DB, a processing module capable of acquiring the desired output result designated by the search request;
comparing an input requirement of the extracted processing module and output requirements of the devices, thereby extracting, from the device DB, one or a plurality of devices having an output usable as an input to the extracted processing module and generating a virtual device composed of a combination of the extracted one or plurality of devices and the extracted processing module; and
providing a user with, as a search result, information concerning the generated virtual device.

10. A device information providing method executed via a computer comprising:
a processing module database (DB) in which information concerning a processing module that analyzes and processes one or a plurality of sensing data and generates new sensing data is registered with respect to a plurality of the processing modules together with at least an input requirement, which is a data requirement of sensing data used as an input, and an output requirement, which is a data requirement of new sensing data to be generated; and
a sensor database (DB) in which information concerning the sensor is registered with respect to a plurality of the sensors together with at least an output requirement, which is a data requirement of sensing data to be output,
the method comprising:
receiving, as a search request for searching for a sensor, a search request including a data requirement for specifying desired sensing data;
comparing the data requirement included in the search request and output requirements of the processing modules, thereby extracting, from the processing module DB, a processing module capable of generating the desired sensing data designated by the search request;

comparing an input requirement of the extracted processing module and output requirements of the sensors, thereby extracting, from the sensor DB, one or a plurality of sensors capable of acquiring sensing data to be used as an input to the extracted processing module and generating a virtual sensor composed of a combination of the extracted one or plurality of sensors and the extracted processing module; and providing a user with, as a search result, information concerning the generated virtual sensor.

11. A non-transitory computer-readable medium comprising a program for causing a computer to comprise:

a processing module database (DB) in which information concerning a processing module that receives, as inputs, outputs from one or a plurality of other devices and combines the inputs to generate a new output is registered with respect to a plurality of the processing modules together with at least an input requirement for specifying an input of a processing module and an output requirement for specifying an output of the processing module; and a device database (DB) in which information concerning the device is registered with respect to a plurality of the devices together with at least an output requirement for specifying an output of the device, wherein the program causes the computer to perform:

receiving, as a search request for searching for a device, a search request including an output requirement for specifying a desired output result;

comparing the output requirement included in the search request and output requirements of the processing modules, thereby extracting, from the processing module DB, a processing module capable of acquiring the desired output result designated by the search request;

comparing an input requirement of the extracted processing module and output requirements of the devices, thereby extracting, from the device DB, one or a plurality of devices having an output usable as an input to the extracted processing module and generating a virtual device composed of a combination of the extracted one or plurality of devices and the extracted processing module; and providing a user with, as a search result, information concerning the generated virtual device.

12. A non-transitory computer-readable medium comprising a program for causing a computer to comprise:

a processing module database (DB) in which information concerning a processing module that analyzes and processes one or a plurality of sensing data and generates new sensing data is registered with respect to a plurality of the processing modules together with at least an input requirement, which is a data requirement of sensing data used as an input, and an output requirement, which is a data requirement of new sensing data to be generated; and a sensor database (DB) in which information concerning the sensor is registered with respect to a plurality of the sensors together with at least an output requirement, which is a data requirement of sensing data to be output, wherein the program causes the computer to perform:

receiving, as a search request for searching for a sensor, a search request including a data requirement for specifying desired sensing data;

comparing the data requirement included in the search request and output requirements of the processing modules, thereby extracting, from the processing module DB, a processing module capable of generating the desired sensing data designated by the search request;

comparing an input requirement of the extracted processing module and output requirements of the sensors, thereby extracting, from the sensor DB, one or a plurality of sensors capable of acquiring sensing data to be used as an input to the extracted processing module and generating a virtual sensor composed of a combination of the extracted one or plurality of sensors and the extracted processing module; and providing a user with, as a search result, information concerning the generated virtual sensor.

* * * * *